US010195519B2

(12) United States Patent
Bachrach et al.

(10) Patent No.: US 10,195,519 B2
(45) Date of Patent: *Feb. 5, 2019

(54) 3D PUZZLE GENERATION, ALGORITHMS FOR GENERATION, AND PHYSICAL INSTANTIATIONS

(71) Applicant: AUTODESK, INC., San Rafael, CA (US)

(72) Inventors: Jonathan Bachrach, Berkeley, CA (US); Saul Griffith, San Francisco, CA (US)

(73) Assignee: AUTODESK, INC., San Rafael, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/154,576

(22) Filed: Jan. 14, 2014

(65) Prior Publication Data

US 2014/0194174 A1    Jul. 10, 2014

Related U.S. Application Data

(63) Continuation of application No. 12/889,319, filed on Sep. 23, 2010, now Pat. No. 8,628,393.

(60) Provisional application No. 61/277,536, filed on Sep. 27, 2009.

(51) Int. Cl.
*A63F 9/12* (2006.01)
*A63F 13/52* (2014.01)
*A63F 9/24* (2006.01)
*G06T 17/20* (2006.01)

(52) U.S. Cl.
CPC .............. *A63F 9/24* (2013.01); *A63F 9/1288* (2013.01); *A63F 13/52* (2014.09); *G06T 17/20* (2013.01); *A63F 2009/1244* (2013.01); *A63F 2009/1296* (2013.01); *A63F 2009/2485* (2013.01); *A63F 2300/6009* (2013.01); *A63F 2300/66* (2013.01)

(58) Field of Classification Search
CPC .. A63F 9/12; A63F 9/24; A63F 9/0612; A63F 9/1208; A63F 2009/1296; A63F 2009/1244; A63F 2009/2485
See application file for complete search history.

(56) References Cited

U.S. PATENT DOCUMENTS

| 2,987,318 | A | * | 6/1961 | Hammer | A63F 9/12 273/157 R |
| 3,485,496 | A | * | 12/1969 | Brunton | A63F 9/10 273/157 R |
| 4,824,112 | A | * | 4/1989 | Roy | A63F 9/1288 273/157 R |

(Continued)

*Primary Examiner* — David Duffy
(74) *Attorney, Agent, or Firm* — Artegis Law Group, LLP

(57) ABSTRACT

A system for generating a three-dimensional puzzle comprises a processor and a memory. The processor is configured to generate a three dimensional mesh representation. The processor is further configured to convert polygons comprising the three-dimensional mesh representation to one or more puzzle piece representations. The processor is further configured to add attachment points and receiving points to the one or more puzzle piece representations. The processor is further configured to provide the one of more puzzle piece representations with attachment points and receiving points. The memory is coupled to the processor and configured to provide the processor with instructions.

22 Claims, 11 Drawing Sheets

(56) References Cited

U.S. PATENT DOCUMENTS

| | | | | |
|---|---|---|---|---|
| 5,251,900 | A | * | 10/1993 | Gallant .................... A63F 9/10 273/157 R |
| 5,842,697 | A | * | 12/1998 | Scott ........................ A63F 9/12 273/157 R |
| D406,620 | S | * | 3/1999 | Everdell ..................... D21/478 |
| 6,086,067 | A | * | 7/2000 | Benoit ..................... A63F 9/12 273/157 R |
| 6,517,071 | B2 | * | 2/2003 | Gallant .................... A63F 9/10 273/157 R |
| 8,298,060 | B2 | * | 10/2012 | Weichselbaum .................. 463/9 |
| 2003/0045335 | A1 | * | 3/2003 | Lantz ............................... 463/9 |
| 2005/0073520 | A1 | * | 4/2005 | Papakipos et al. ........... 345/420 |
| 2008/0228450 | A1 | * | 9/2008 | Jakobsen et al. ................. 703/2 |
| 2009/0091080 | A1 | * | 4/2009 | Paquette ................... 273/153 S |
| 2009/0258687 | A1 | * | 10/2009 | Weichselbaum ................. 463/9 |

* cited by examiner

3D PUZZLE GENERATION, ALGORITHMS FOR GENERATION, AND PHYSICAL INSTANTIATIONS

CROSS-REFERENCE TO RELATED APPLICATIONS

This application is a continuation of co-pending U.S. patent application titled, "3D PUZZLE GENERATION, ALGORITHMS FOR GENERATION, AND PHYSICAL INSTANTIATIONS," filed on Sep. 23, 2010 and having Ser. No. 12/889,319, issued on Jan. 14, 2014 as U.S. Pat. No. 8,628,393, which claims the benefit of U.S. provisional patent application titled, "3D PUZZLE GENERATION, ALGORITHMS FOR GENERATION, AND PHYSICAL INSTANTIATIONS" filed on Sep. 24, 2009 and having Ser. No. 61/277,536. The subject matter of these related applications are hereby incorporated herein by reference.

BACKGROUND OF THE INVENTION

Jigsaw puzzles have been a popular diversion for hundreds of years. A typical two-dimensional jigsaw puzzle comprises a flat sheet of material (e.g., cardboard), typically with a picture printed on the front, cut into pieces to be reassembled. Methods for determining the pattern to cut the sheet can be fairly simple, for example, the sheet of material can nominally be cut along a grid pattern. The grid pattern is typically modified to make the pieces distinct from one another (e.g., by pulling grid points away from their original locations), and connections are added (e.g., connections formed from plugs protruding out from a piece and complementary holes entering into a piece). A three-dimensional jigsaw puzzle can be considerably more complicated to design. A three-dimensional shape can be built up from flat pieces connected together at angles to one another; however, this process causes the finished three-dimensional shape to depend on the shapes of the pieces, unlike a two-dimensional puzzle. Determining the shapes of the pieces to create a desired three-dimensional volume can be very complicated. Additionally, in order to join the pieces at angles to one another, the pieces must bend at the joints. Fabricating the pieces such that they bend at the joints, by a particular amount, in a durable and repeatable way, can be difficult and expensive.

BRIEF DESCRIPTION OF THE DRAWINGS

Various embodiments of the invention are disclosed in the following detailed description and the accompanying drawings.

FIG. 4A comprises a top-down view.

FIG. 4B comprises a side view.

DETAILED DESCRIPTION

Figure 1:
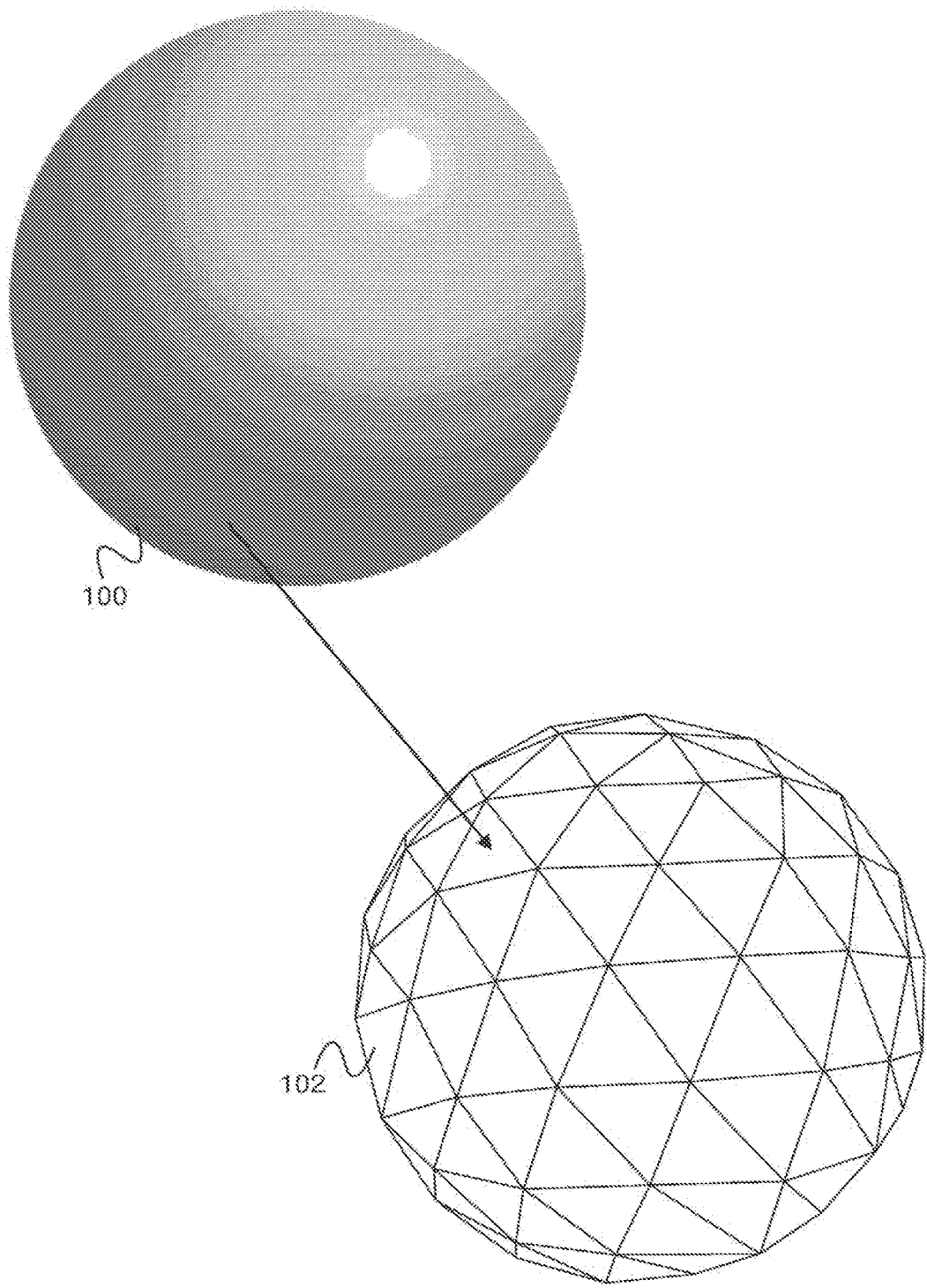
FIG. 1 is a diagram illustrating an embodiment of a meshing operation.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for 3D puzzle generation is disclosed. The system comprises a processor and a memory. The system processor is configured to generate a three dimensional mesh representation, convert polygons comprising the three-dimensional mesh representation to one or more puzzle piece representations, add attachment points and receiving points to the one or more puzzle piece representations, and provide the one or more puzzle piece representations with attachment points and receiving points.

In some embodiments, a three dimensional shape is received and turned into a mesh. The mesh is then converted into puzzle pieces. The puzzle pieces are given attachment points and receiving points so that the puzzle can be constructed into a shape closely resembling the received three dimensional shape. The puzzle pieces with the attachment points and receiving points are fabricated.

A process for dividing a given three dimensional surface into an operator selectable number of pieces is disclosed. The process selects how to best divide the surface to preserve its original shape. The original surface can be a continuous representation, or a discrete representation of a 3D object, for example, a triangulated or quad mesh. The selection process is tuned to preserve the object's original shape as much as possible given the constraints dictated by the operator's selection of how many discrete triangles or quads they want in the final mesh representation of the 3D object. Minimum average error or displacement from original surface is one such way to tune this selection process.

The pieces are individually labeled and attachment points and receiving points are added to each point automatically. These labels and attachments are placed subject to constraints chosen by the operator. The attachments could be things like holes aligned for pop-riveting, or for male and female connectors such as those on traditional jigsaw puzzles. The constraints for the attachments are things like one attachment per side, or two rivet holes per side. The selection of these attachments may require modification of original mesh to accommodate the sizes or shapes of the attachments. These attachment mechanics can be adjusted depending on operator input or material selection. The operator can adjust the desired shape parameters for the pieces to make, for example, pieces more long and narrow or more square.

The pieces of the puzzle or sculpture are all flat and constructed to allow for folding where connections with neighboring pieces is required. In order to make the folding possible the pieces can be made in several layers. The top, and optionally bottom, layer are structural layers and a middle layer acts as a hinge layer to keep the pieces in the structural layer in the proper relative orientation. As the pieces bend at the hinge locations, material must be removed from the structural layer in order to prevent the layer from buckling. The amount of space that must be removed to accommodate the bending is determined automatically according to material properties and connector type. Alternatively, the pieces may be molded from a material when a thin, flexible, region can be formed at the joint, or molded from a material where the joint can be fixed into its correctly angled position.

3D puzzle generation, algorithms for generation, and physical instantiations are disclosed. A three-dimensional surface is first converted into a three-dimensional mesh representation. The three-dimensional surface may initially comprise a continuous representation (e.g., Bezier curves, NURBS curves, etc.), a discrete representation (e.g., a voxel array, a polygon array, etc.), or any other appropriate representation. The three-dimensional mesh representation comprises a set of simple polygons (e.g., triangles, quads) in three-dimensional space. The translation of the initial three-dimensional surface into a mesh representation may be tuned by an operator to control parameters such as number of polygons, polygon geometry characteristics, mesh accuracy control, etc. The three-dimensional mesh representation is then converted into a set of two-dimensional puzzle piece representations. Either a one to one or many to one conversion of polygons to puzzle pieces may be used. This translation may also be furred by an operator, to control parameters such as number of polygons per piece, piece geometry characteristics, etc. Finally, connections are added to the puzzle pieces. These connections may be analogous to the connections formed from plugs and holes in a two-dimensional puzzle, or may comprise tabs and slots, rivet connection points, etc. When the pieces are fabricated, a hinge region is included in the piece, connecting the original polygon area with the connection point (e.g., the protruding plug, tab, etc.) The hinge region can be formed using one of many methods, including a multilayer design comprising structural and flexible layers, or a molded design with the hinge region formed thin enough so as to be flexible.

In some embodiments, the technique comprises a passive self-assembly process for reconstructing 3-dimensional (3D) surfaces using named parts, interconnecting points, and angles—a low cost way to construct 3D surfaces using automatically determined two dimensional parts—creating flat packs. Flat pack refers to a style of packaging of products as multiple flat pieces requiring assembly by the consumer. Flat pack products benefit sellers because they are smaller and easier to ship and take less space to store and benefit consumers because they are less expensive.

In some embodiments, uniqueness is generated in tab or slot sizes or pictures placed on the surface as a possibility for making a puzzle where the aim is to figure out how the pieces of the puzzle go together. For example, sizes and shapes of tabs and slots can be made unique as in traditional jigsaw pieces, such that only meant to be mated tab and slot pairs fit. Another possibility from traditional jigsaw puzzles for aiding assembly is for an image texture to be mapped across the 2-dimensional (2D) parts such that, when assembled, images on neighboring pieces line up and form a coherent whole.

In some embodiments, there are multiple rivets or attachment points per edge. In some embodiments, a flexure comprises a dashed line in the material comprising the puzzle.

FIG. 1 is a diagram illustrating an embodiment of a meshing operation. In the example shown, three-dimensional surface 100 comprises a representation of a sphere. In various embodiments, three-dimensional surface 100 comprises a continuous representation (e.g., Bezier curves, NURBS curves, etc.), a discrete representation (e.g., a voxel array, a polygon array, etc.), or any other appropriate representation of a sphere. In various embodiments, three-dimensional surface 100 comprises a sphere, an elephant, a fire truck, a baseball bat, or any other appropriate three-dimensional surface. The meshing operation of FIG. 1 converts three-dimensional surface 100 into three-dimensional mesh representation 102. Three-dimensional mesh representation 102 comprises a set of points and lines in three-dimensional space. In the example shown, three-dimensional mesh representation 102 comprises a triangular mesh representation, in which the lines form triangles. In some embodiments, three-dimensional mesh representation comprises a quadrilateral mesh representation, in which the lines form quadrilaterals.

The triangles comprising three-dimensional mesh representation 102 approximate three-dimensional surface 100. In various embodiments, the triangles comprising three-dimensional mesh representation 102 approximate three-dimensional surface 100 with a minimum average error, the triangles comprising three-dimensional mesh representation 102 approximate three-dimensional surface 100 with a minimum peak error, the triangles comprising three-dimensional mesh representation 102 approximate three-dimensional surface 100 with a minimum triangle size deviation, or the triangles comprising three-dimensional mesh representation 102 approximate three-dimensional surface 100 according to any other appropriate constraint. In various embodiments, an operator may tune the meshing operation to control the average size of the polygons in three-dimensional mesh representation 100, to control the size deviation of polygons in three-dimensional mesh representation 100, to control the error measurement of the meshing operation (e.g., average error between three-dimensional surface 100 and three-dimensional mesh representation 102, peak error between three-dimensional surface 100 and three-dimensional mesh representation 102, etc), to control the relative importance of different parameters controlling the meshing operation, or by any other appropriate operator control.

In some embodiments, the mesh comprises a mixed set of polygons, a set of polygons, a set of triangles, a set of quadrilateral shapes, or any other appropriate geometrical entity.

Figure 2A:
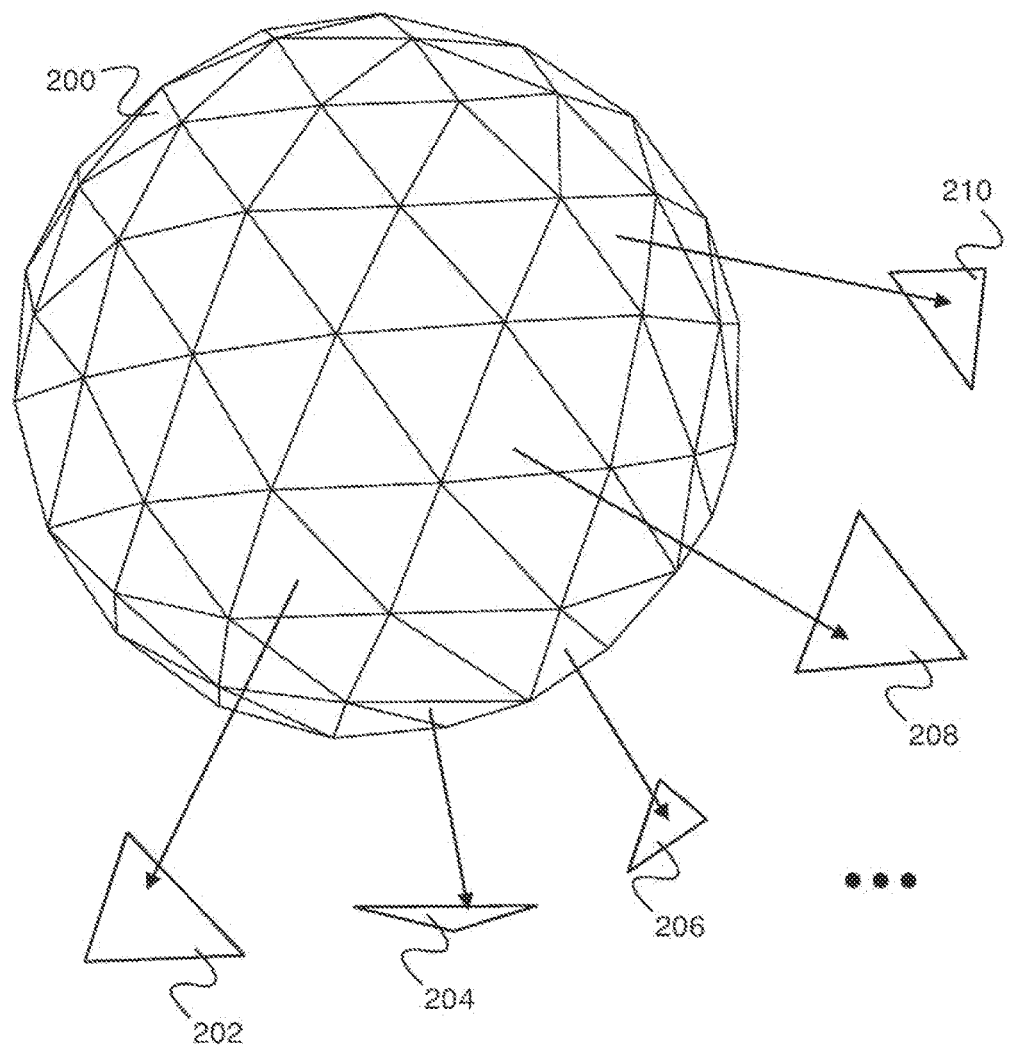
FIG. 2A is a diagram illustrating an embodiment of a puzzle piece representation creation operation.

FIG. 2A is a diagram illustrating an embodiment of a puzzle piece representation creation operation. In some embodiments, three-dimensional mesh representation 200 comprises three-dimensional mesh representation 102 of FIG. 1. In the example shown, three-dimensional mesh representation 200 is converted into a set of puzzle piece representations. The set of puzzle piece representations includes puzzle piece representation 202, puzzle piece representation 204, puzzle piece representation 206, puzzle piece representation 208, and puzzle piece representation 210. In the puzzle piece creation operation shown in FIG. 2A, each triangle comprising three-dimensional mesh representation 200 is converted into a puzzle piece representation. Each puzzle piece representation comprises one triangle.

A puzzle piece representation comprises a two-dimensional geometry. In the example shown, a puzzle piece representation comprises a triangle. In various embodiments, a puzzle piece representation comprises a triangle, a quadrilateral, a hexagon, or a two dimensional geometry comprising any other appropriate number of sides. In the example shown, triangles comprising three-dimensional mesh representation 200 are converted into puzzle pieces comprising triangles represented in two dimensions.

Figure 2B:
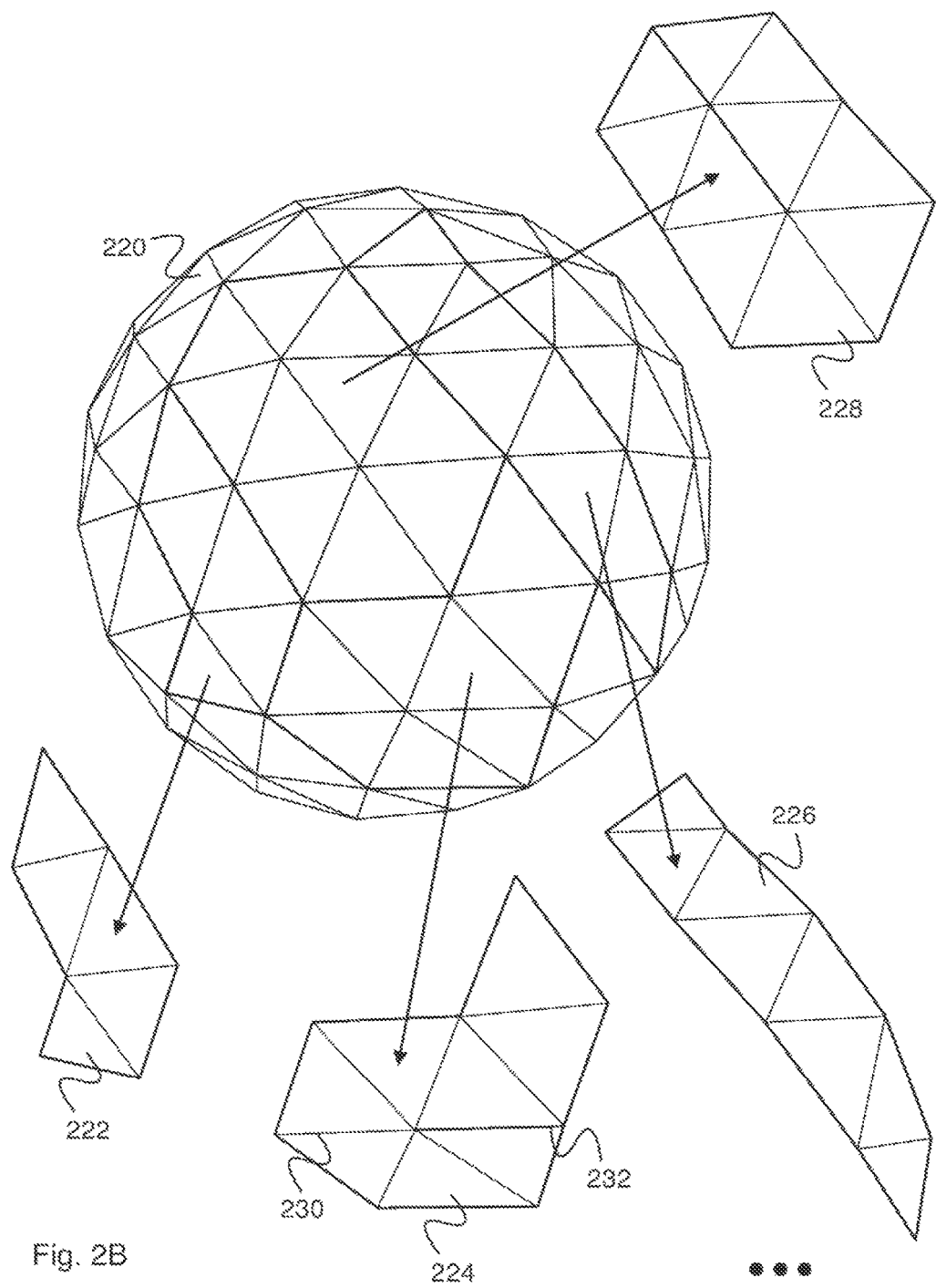
FIG. 2B is a diagram illustrating an embodiment of a puzzle piece representation creation operation.

FIG. 2B is a diagram illustrating an embodiment of a puzzle piece representation creation operation. In some embodiments, three-dimensional mesh representation 220 comprises three-dimensional mesh representation 102 of FIG. 1. In the example shown, three-dimensional mesh representation 220 is converted into a set of puzzle piece representations. The set of puzzle piece representations includes puzzle piece representation 222, puzzle piece representation 224, puzzle piece representation 226, and puzzle piece representation 228. In the puzzle piece creation operation shown in FIG. 2B, each triangle comprising three-dimensional mesh representation 220 is converted into all or part of a puzzle piece representation. Each puzzle piece representation comprises one or more triangles. In some embodiments, all puzzle piece representations comprise the same number of triangles. In some embodiments, puzzle piece representations comprise a random number of triangles, an operator controlled number of triangles, or any other appropriate number of triangles.

A puzzle piece representation comprises a two-dimensional geometry. In the example shown, a puzzle piece representation comprises a triangle or connected collection of triangles. In some embodiments a puzzle piece representation must bend at the border between triangles to allow the puzzle piece representation to be assembled as part of three-dimensional mesh representation 220. The puzzle piece representations comprise flexible joints (e.g., joint 230) that can bend, allowing the puzzle piece representation to form the appropriate three-dimensional shape. In some embodiments, puzzle piece representations additionally comprise information describing the angle formed at the flexible joint when the piece is in its appropriate three-dimensional shape to be used when fabricating the puzzle piece. In some embodiments, the puzzle piece representations comprise internal cuts (e.g., cut 232) that allow the puzzle piece representation to form the appropriate three-dimensional shape.

In various embodiments, the puzzle piece representation creation operation of FIG. 2B may be tuned by an operator to control the average number of polygons forming each piece representation, to control the deviation in number of polygons forming each piece representation, to control the average shape of each piece representation, to control the average aspect ratio of each piece representation, or by any other appropriate operator control.

Figure 3A:
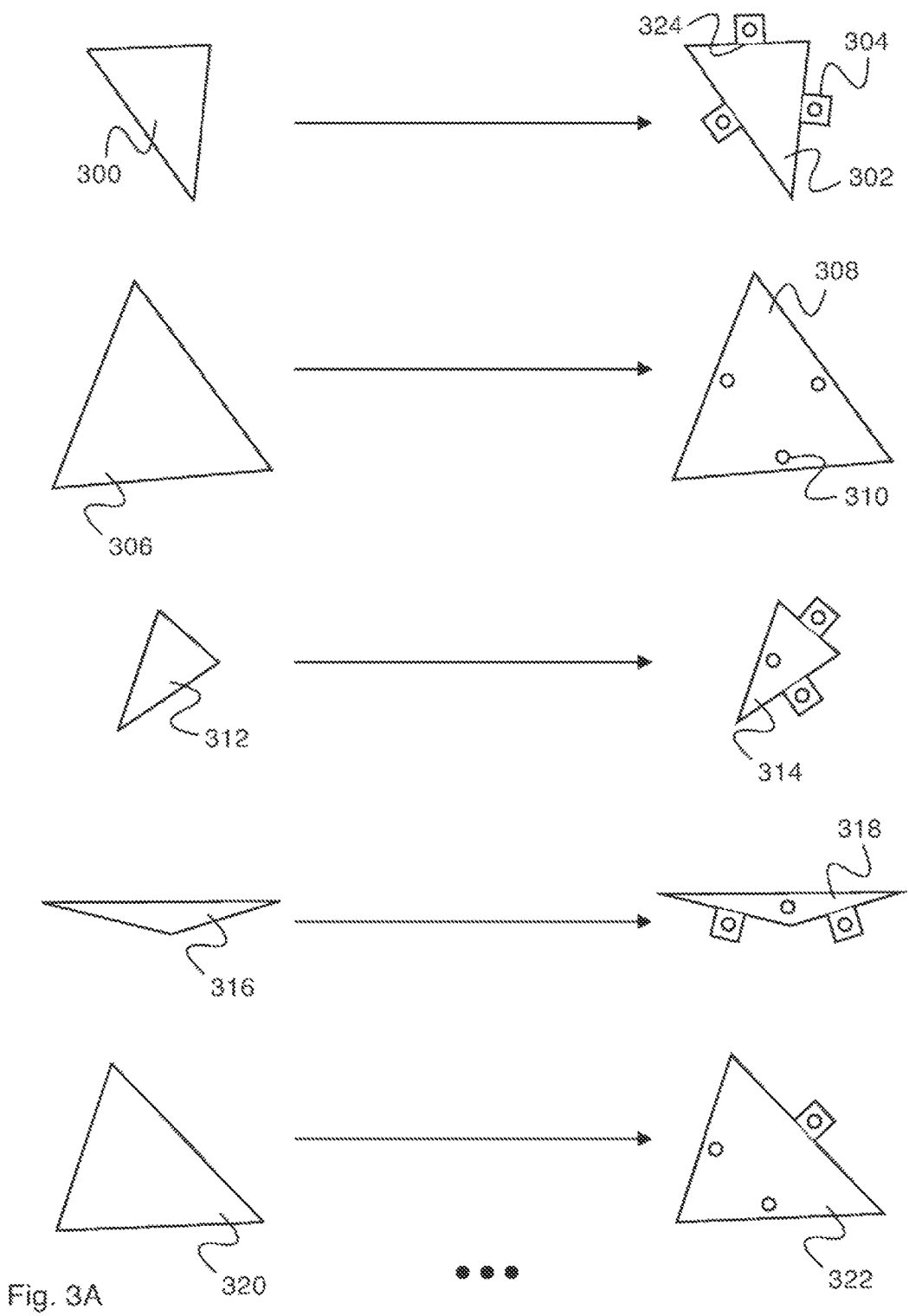
FIG. 3A is a diagram illustrating an embodiment of an attachment and receiving point addition operation.

FIG. 3A is a diagram illustrating an embodiment of an attachment and receiving point addition operation. In some embodiments, puzzle piece representation 300 comprises puzzle piece representation 202 of FIG. 2A, puzzle piece representation 306 comprises puzzle piece representation 204 of FIG. 2A, puzzle piece representation 312 comprises puzzle piece representation 206 of FIG. 2A, puzzle piece representation 316 comprises puzzle piece representation 208 of FIG. 2A, and puzzle piece representation 320 comprises puzzle piece representation 210 of FIG. 2A. An attachment and receiving point addition operation comprises adding attachment and/or receiving points to a set of puzzle piece representations. In the example shown, three attachment points (e.g., attachment point 304) are added to puzzle piece representation 300 to produce puzzle piece representation 302. Three receiving points (e.g., receiving point 310) are added to puzzle piece representation 306 to produce puzzle piece representation 308. Two attachment points and one receiving point are added to puzzle piece representation 312 to produce puzzle piece representation 314, two attachment points and one receiving point are added to puzzle piece representation 316 to produce puzzle piece representation 318, and one attachment point and two receiving points are added to puzzle piece representation 320 to produce puzzle piece representation 322. Each puzzle piece representation in the set of puzzle piece representations (e.g., the set of puzzle piece representations produced from three-dimensional mesh representation 200 of FIG. 2A) has attachment and receiving points added. In the example shown, a puzzle piece representation comprises a triangle. In various embodiments, a puzzle piece representation comprises a triangle, a quadrilateral, a hexagon, or a two dimensional geometry comprising any other appropriate number of sides. One attachment or receiving point is added for each side of the puzzle piece representation. In various embodiments, attachment points are added to each side of a puzzle piece representation, receiving points are added to each side of a puzzle piece representation, or any appropriate combination of attachment and receiving points are added to the sides of a puzzle piece representation.

In some embodiments a puzzle piece representation must bend at the border where an attachment point was added to allow the puzzle piece representation to be assembled as part of a three-dimensional mesh representation (e.g., three-dimensional mesh representation 220). The puzzle piece representations comprise flexible joints (e.g., joint 324) that can bend, allowing the puzzle piece representation to form the appropriate three-dimensional shape. In some embodiments, puzzle piece representations additionally comprise information describing the angle formed at the flexible joint when the piece is in its appropriate three-dimensional shape to be used when fabricating the puzzle piece.

In the example shown, the attachment and receiving points comprise attachment and receiving points for pop-rivets. A joint is formed by aligning the hole of an attachment point with the hole of a receiving point and attaching a pop-rivet into the hole to fasten the pieces together. In various embodiments, attachment and receiving points comprise attachment and receiving points for pop-rivets, tabs and slots, pings and gaps, or any other appropriate attachment and receiving points.

Figure 3B:
FIG. 3B is a diagram illustrating an embodiment of an attachment and receiving point addition operation.

FIG. 3B is a diagram illustrating an embodiment of an attachment and receiving point addition operation. In some embodiments, puzzle piece representation 340 comprises puzzle piece representation 210 of FIG. 2A. In the example shown, one attachment point and two receiving points are added to puzzle piece representation 340 to produce puzzle piece representation 342. Attachment point 344 comprises a tab attachment point and receiving point 346 comprises a slot receiving point. A joint is formed by inserting a tab attachment point into a slot receiving point until it does not easily come back out.

Figure 3C:
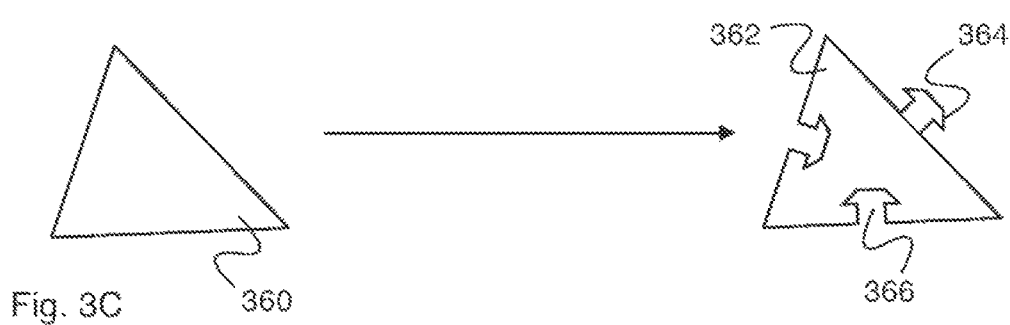
FIG. 3C is a diagram illustrating an embodiment of an attachment and receiving point addition operation.

FIG. 3C is a diagram illustrating an embodiment of an attachment and receiving point addition operation. In some embodiments, puzzle piece representation 360 comprises puzzle piece representation 210 of FIG. 2A. In the example shown, one attachment point and two receiving points are added to puzzle piece representation 360 to produce puzzle piece representation 362. Attachment point 364 comprises a plug attachment point and receiving point 366 comprises a gap receiving point. A joint is formed by inserting a plug attachment point into a gap receiving point until it fits securely.

Figure 3D:
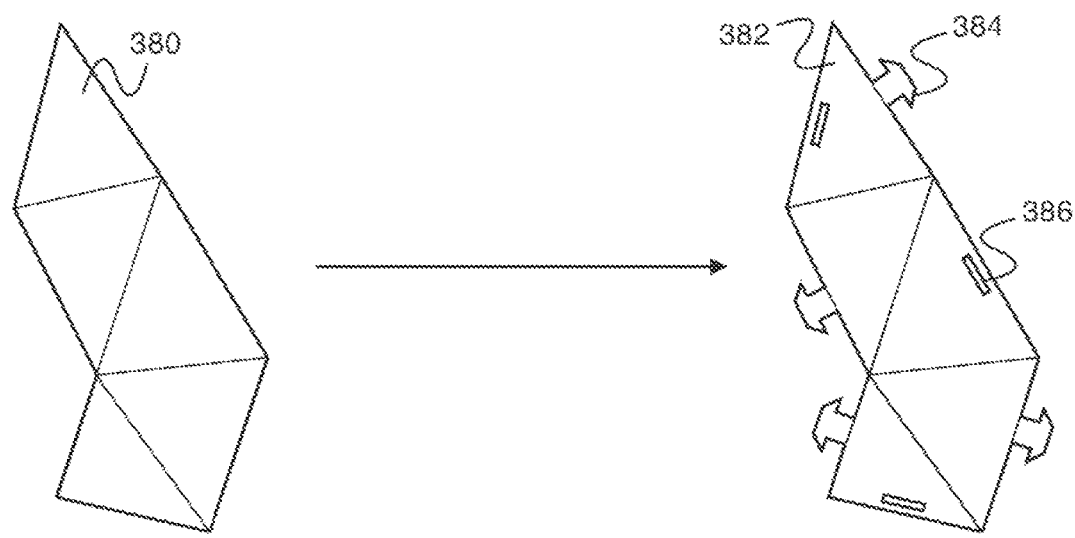
FIG. 3D is a diagram illustrating an embodiment of an attachment and receiving point addition operation.

FIG. 3D is a diagram illustrating an embodiment of an attachment and receiving point addition operation. In some embodiment, puzzle piece representation 380 comprises puzzle piece representation 222 of FIG. 2B. In the example shown, four attachment points (e.g., attachment point 384) and three receiving points (e.g., receiving point 386) are added to puzzle piece 380 to produce puzzle piece representation 382. In some embodiments, when a puzzle piece representation comprises multiple polygons from a three-dimensional mesh representation, attachment and/or receiving points are added to each side of the puzzle piece representation (e.g., to each side of the seven sides of puzzle piece representation 380). In some embodiments, when a puzzle piece representation comprises multiple polygons from a three-dimensional mesh representation, one or more of the sides does not receive an attachment or receiving point. In some embodiments, when a puzzle piece representation comprises multiple polygons from a three-dimensional mesh representation and comprises an internal cut (e.g., cut 232 of FIG. 2B), one puzzle piece representation side adjoining the cut has an attachment point added and one puzzle piece representation side adjoining the cut has a receiving point added. In some embodiments, when a puzzle piece representation comprises multiple polygons from a three-dimensional mesh representation and comprises an internal cut, the puzzle piece representation sides adjoining the cut do not have attachment or receiving points added.

Figure 4A:
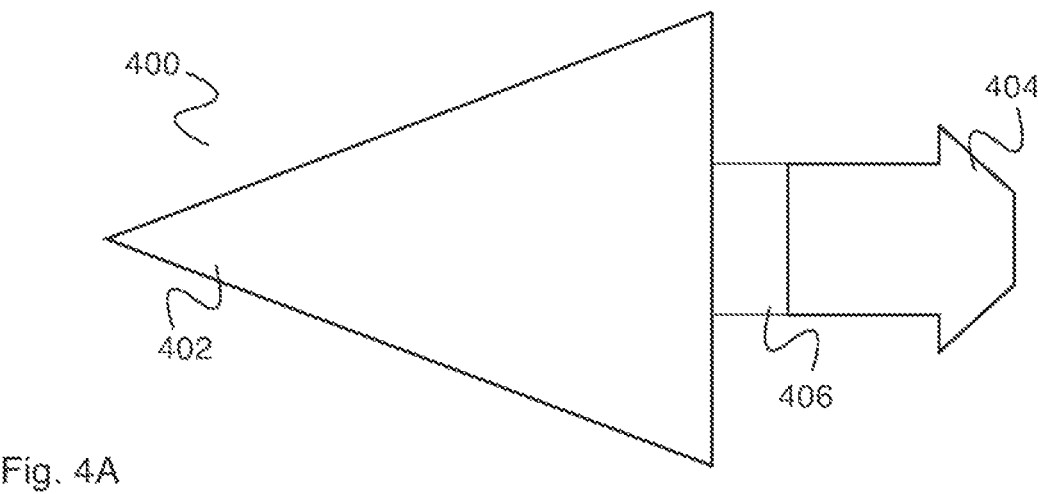
FIG. 4A is a diagram illustrating an embodiment of a puzzle piece.

FIG. 4A is a diagram illustrating an embodiment of a puzzle piece. FIG. 4A comprises a top-down view. In some embodiments, puzzle piece 400 comprises a puzzle piece fabricated according to a puzzle piece representation (e.g., puzzle piece representation 302 of FIG. 3A). In the example shown, puzzle piece 400 comprises triangle 402, attachment point 404, and joint 406. Triangle 402 comprises a triangle from a three-dimensional mesh representation (e.g., three-dimensional mesh representation 200 of FIG. 2). Attachment point 404 comprises an attachment point (e.g., attachment point 344 of FIG. 3B) for attaching the puzzle piece to another puzzle piece. Joint 406 comprises a flexible joint (e.g., joint 324 of FIG. 3A) for allowing attachment point 404 to move relative to triangle 402. In some embodiments, triangle 402 and attachment point 404 are made from a structural material, and joint 406 exists where there is a gap in the structural material layer.

Figure 4B:
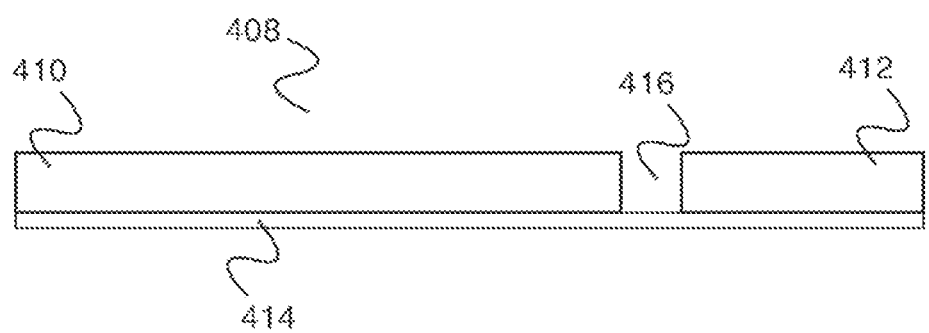
FIG. 4B is a diagram illustrating an embodiment of a puzzle piece.

FIG. 4B is a diagram illustrating an embodiment of a puzzle piece. FIG. 4B comprises a side view. In some embodiments, puzzle piece 408 comprises a side view of puzzle piece 400 of FIG. 4A. In the example shown, puzzle piece 408 comprises structural layer section 410, structural layer section 412, flexible layer section 414, and gap 416. In some embodiments, structural layer section 410 comprises triangle 402 of FIG. 4A. In some embodiments, structural layer section 412 comprises attachment point 404 of FIG. 4A. Flexible layer section 414 is held stiff by structural layer section 410 and structural layer section 412, but able to flex in the region underneath gap 416. In some embodiments, the region of flexible layer section 414 underneath gap 416 comprises joint 406 of FIG. 4A. The size of gap 416 (e.g., the shortest distance from an edge of structural layer section 410 to an edge of structural layer section 412) determines the maximum angle that the piece can bend (e.g., the maximum angle that attachment point 404 of FIG. 4A can bend relative to triangle 402 of FIG. 4A). In some embodiments, the angle that the piece bends at joint 406 of FIG. 4A is determined from the three-dimensional mesh representation (e.g., three-dimensional mesh representation 200 of FIG. 2A) and stored as part of the puzzle piece representation creation operation (e.g., the puzzle piece representation creation operation of FIG. 2A) for use in determining the appropriate size of gap 416.

In some embodiments, puzzle piece 408 is fabricated by cutting from a larger blank of material comprising a structural layer (e.g., the structural layer comprising structural layer section 410 and structural layer section 412) and a flexible layer (e.g., the flexible layer comprising flexible layer section 414). The piece is fabricated by cutting the outer perimeter of the piece (e.g., the outer perimeter of puzzle piece 400 of FIG. 4A) from both the structural layer and the flexible layer of the blank material and then removing material from the structural layer to form gap 416.

Figure 4C:
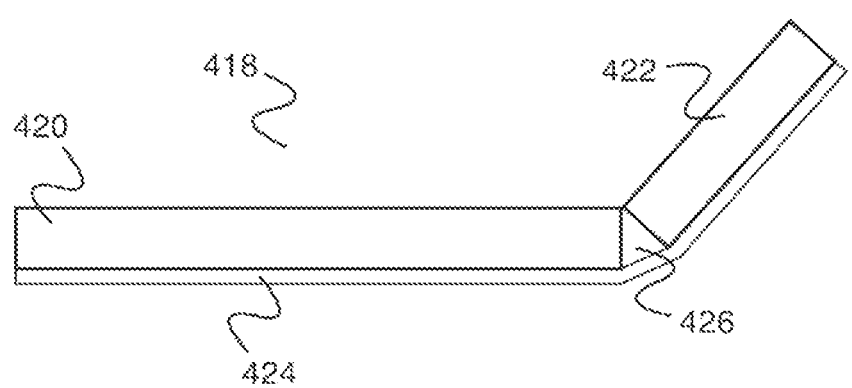
FIG. 4C is an illustration of an embodiment of a bent puzzle piece.

FIG. 4C is an illustration of an embodiment of a bent puzzle piece. FIG. 4C comprises a side view. In some embodiments, puzzle piece 418 comprises a side view of puzzle piece 400 of FIG. 4A. In the example shown, puzzle piece 418 comprises structural layer section 420, structural layer section 422, flexible layer section 424, and gap 426. In some embodiments, structural layer section 420 comprises triangle 402 of FIG. 4A. In some embodiments, structural layer section 422 comprises attachment point 404 of FIG. 4A. In some embodiments, the region of flexible layer section 414 underneath gap 426 comprises joint 406 of FIG. 4A. In the example shown, flexible layer 424 is bent until structural layer section 422 comes into contact with structural layer section 420. Structural layer section 422 comes into contact with structural layer section 420 when a certain angle, determined by the size of gap 426, has been formed between structural layer section 422 and structural layer section 420.

Figure 4D:
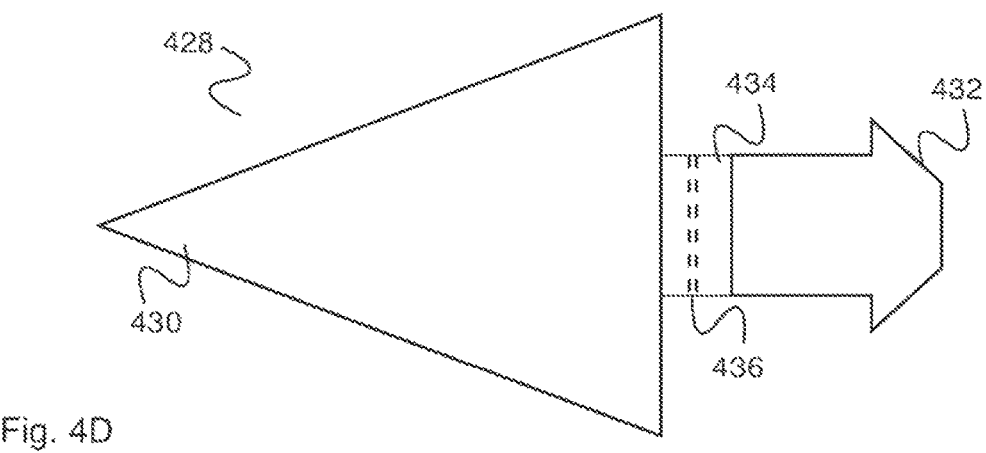
FIG. 4D is a diagram illustrating an embodiment of a puzzle piece.

FIG. 4D is a diagram illustrating an embodiment of a puzzle piece. FIG. 4D comprises a top-down view. In some embodiments, puzzle piece 428 comprises a puzzle piece fabricated according to a puzzle piece representation (e.g., puzzle piece representation 302 of FIG. 3A). In the example shown, puzzle piece 428 comprises triangle 430, attachment point 432, first joint region 434, and second joint region 436. Triangle 402 comprises a triangle from a three-dimensional mesh representation (e.g., three-dimensional mesh representation 200 of FIG. 2). Attachment point 404 comprises an attachment point (e.g., attachment point 344 of FIG. 3B) for attaching the puzzle piece to another puzzle piece. First joint region 434 and second joint region 436 comprise a flexible joint (e.g., joint 324 of FIG. 3A) for allowing attachment point 432 to move relative to triangle 430. In some embodiments, triangle 430 and attachment point 432 are made from a structural material first joint region 434 is fabricated as a gap in a first structural material layer, and second joint region 436 is fabricated as a gap in a second structural material layer.

Figure 4E:
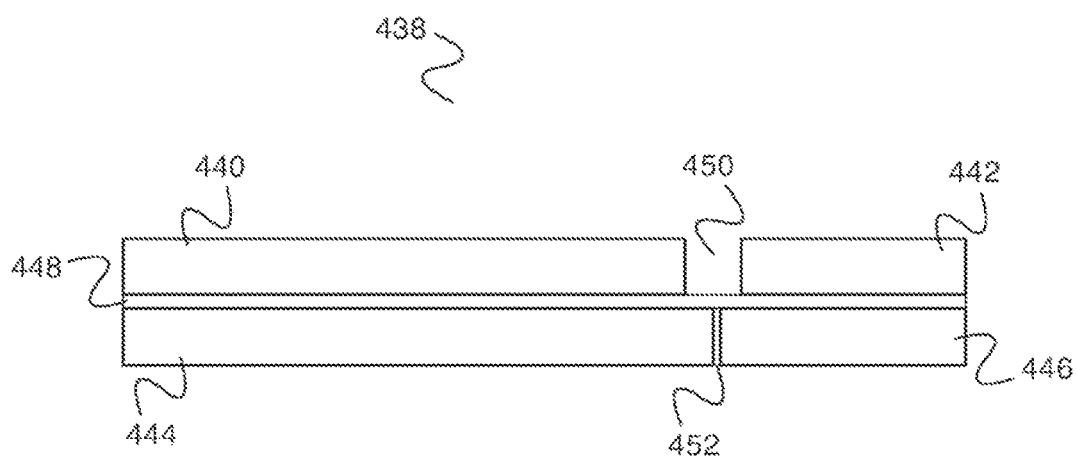
FIG. 4E is a diagram illustrating an embodiment of a puzzle piece.

FIG. 4E is a diagram illustrating an embodiment of a puzzle piece. FIG. 4E comprises a side view. In some embodiments, puzzle piece 438 comprises a side view of puzzle piece 428 of FIG. 4D. In the example shown, puzzle piece 438 comprises first structural layer section 440, first structural layer section 442, second structural layer section 444, second structural layer section 446, flexible layer section 448, gap 450, and gap 452. In some embodiments, first structural layer section 440 and second structural layer section 444 comprise triangle 430 of FIG. 4D. In some embodiments, first structural layer section 442 and second structural layer section 446 comprise attachment point 432 of FIG. 4D. Flexible layer section 448 is held stiff by first structural layer section 440, first structural layer section 442, second structural layer section 444, and second structural layer section 446, but able to flex in the region where gap 450 and gap 452 overlap. In some embodiments, the region of flexible layer section 448 underneath gap 450 comprises first joint region 434 of FIG. 4D, and the region of flexible layer section above gap 452 comprises second joint region 434 of FIG. 4D. The size of gap 450 (e.g., the shortest distance from an edge of first structural layer section 440 to an edge of first structural layer section 442) determines the maximum angle that the piece can bend (e.g., the maximum angle that attachment point 432 of FIG. 4D can bend relative to triangle 430 of FIG. 4D) in a first direction (e.g., upwards as drawn on the page in FIG. 4E). The size of gap 452 (e.g., the shortest distance from an edge of second structural layer section 444 to an edge of second structural layer section 446) determines the maximum angle that the piece can bend (e.g., the maximum angle that attachment point 432 of FIG. 4D can bend relative to triangle 430 of FIG. 4D) in a second direction (e.g., downwards as drawn on the page in FIG. 4E). In some embodiments, the angle that the piece bends at first joint region 434 of FIG. 4D or second joint region 436 of FIG. 4D is determined from the three-dimensional mesh representation (e.g., three-dimensional mesh representation 200 of FIG. 2A) and stored as part of the puzzle piece representation creation operation (e.g., the puzzle piece representation creation operation of FIG. 2A) for use in determining the appropriate size of gap 450 or gap 452. In some embodiments, the size of gap 450 is determined from the desired maximum angle the joint is to bend in a first direction, and the size of gap 452 is fabricated to be a minimum size, to permit a minimum amount of bending in a second direction.

In some embodiments, puzzle piece 438 is fabricated by cutting from a larger blank of material comprising two structural layers (e.g., the first structural layer comprising first structural layer section 440 and first structural layer section 442 and the second structural layer comprising second structural layer section 444 and second structural layer section 446) and a flexible layer (e.g., the flexible layer comprising flexible layer section 448). The piece is fabricated by cutting the outer perimeter of the piece (e.g., the outer perimeter of puzzle piece 428 of FIG. 4D) from the stack of two structural layers and a flexible layer and then removing material from the first structural layer to form gap 450 and removing material from the second structural layer to form gap 452.

Figure 4F:
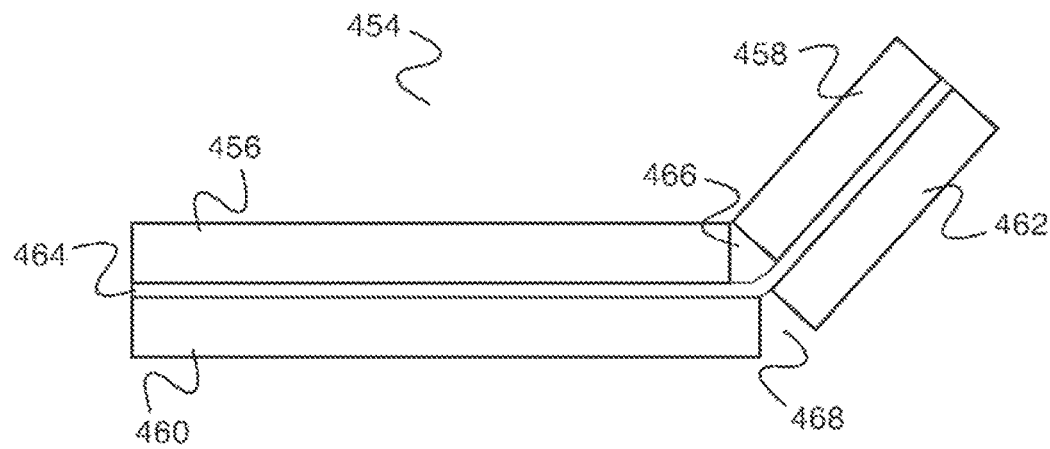
FIG. 4F is an illustration of an embodiment of a bent puzzle piece.

FIG. 4F is an illustration of an embodiment of a bent puzzle piece. FIG. 4F comprises a side view. In some embodiments, puzzle piece 454 comprises a side view of puzzle piece 428 of FIG. 4D. In the example shown, puzzle piece 454 comprises first structural layer section 456, first structural layer section 458, second structural layer section 460, second structural layer section 462, flexible layer section 464, gap 466, and gap 468. In some embodiments, first structural layer section 456 and second structural layer section 460 comprise triangle 430 of FIG. 4D. In some embodiments, first structural layer section 458 and second structural layer section 462 comprise attachment point 432 of FIG. 4D. Flexible layer section 464 is held stiff by first structural layer section 456, first structural layer section 458, second structural layer section 460, and second structural layer section 462, but able to flex in the region where gap 466 and gap 468 overlap. In some embodiments, the region of flexible layer section 464 underneath gap 466 comprises first joint region 434 of FIG. 4D, and the region of flexible layer section above gap 468 comprises second joint region 434 of FIG. 4D.

In the example shown, flexible layer 464 is bent until first structural layer section 458 comes into contact with first structural layer section 456. First structural layer section 458 comes into contact with first structural layer section 436 when a certain angle, determined by the size of gap 466, has been formed between first structural layer section 458 and first structural layer section 456. In some embodiments, the size of gap 466 is chosen to form a specific maximum bend angle. In some embodiments, the specific maximum bend angle is determined from a three-dimensional mesh representation (e.g., three-dimensional mesh representation 200 of FIG. 2A).

Figure 4G:
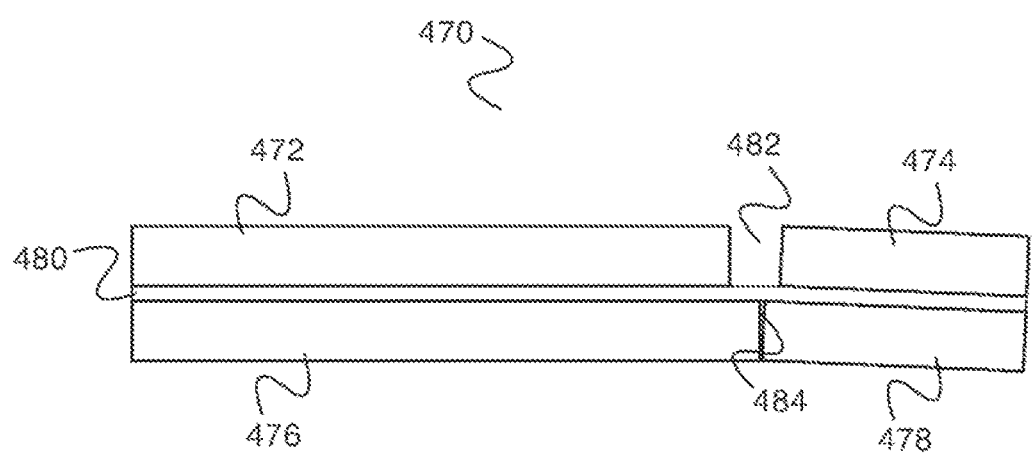
FIG. 4G is an illustration of an embodiment of a bent puzzle piece.

FIG. 4G is an illustration of an embodiment of a bent puzzle piece. FIG. 4G comprises a side view. In some embodiments, puzzle piece 470 comprises a side view of puzzle piece 428 of FIG. 4D. In the example shown, puzzle piece 470 comprises first structural layer section 472, first structural layer section 474, second structural layer section 476, second structural layer section 478, flexible layer section 480, gap 482, and gap 484. In some embodiments, first structural layer section 472 and second structural layer section 476 comprise triangle 430 of FIG. 4D. In some embodiments, first structural layer section 474 and second structural layer section 478 comprise attachment point 432 of FIG. 4D. Flexible layer section 480 is held stiff by first structural layer section 472, first structural layer section 474, second structural layer section 476, and second structural layer section 478, but able to flex in the region where gap 482 and gap 484 overlap. In some embodiments, the region of flexible layer section 480 underneath gap 482 comprises first joint region 434 of FIG. 4D, and the region of flexible layer section above gap 484 comprises second joint region 434 of FIG. 4D.

In the example shown, flexible layer 480 is bent until second structural layer section 478 comes into contact with second structural layer section 476. Second structural layer section 478 comes into contact with second structural layer section 476 when a certain angle, determined by the size of gap 484, has been formed between first structural layer section 478 and first structural layer section 476. In some embodiments, the size of gap 484 is chosen to form a specific maximum bend angle. In some embodiments, the specific maximum bend angle is determined from a three-dimensional mesh representation (e.g., three-dimensional mesh representation 200 of FIG. 2A). In some embodiments, the size of gap 484 is a minimum gap size, to minimize the maximum bend angle. In some embodiments, the minimum gap size is determined by the process used to fabricate gap 484.

Figure 5A:
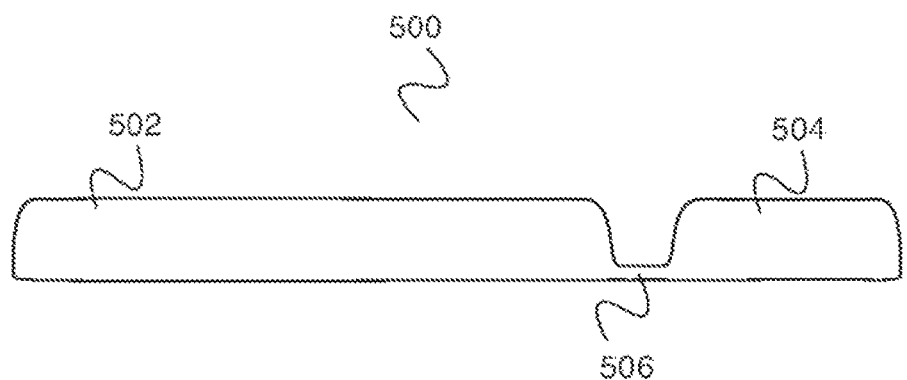
FIG. 5A is a diagram illustrating an embodiment of a puzzle piece.

FIG. 5A is a diagram illustrating an embodiment of a puzzle piece. FIG. 5A comprises a side view. In some embodiments, puzzle piece 500 comprises a side view of puzzle piece 400 of FIG. 4A. In the example shown, puzzle piece 500 comprises first structural region 502, second structural region 504, and flexible region 506. In some embodiments, first structural region comprises triangle 402 of FIG. 4A, second structural region 504 comprises attachment point 404 of FIG. 4A, and flexible region 506 comprises joint 406 of FIG. 4A. The length of flexible region 506 determines the maximum angle that the piece can bend (e.g., the maximum angle that attachment point 404 of FIG. 4A can bend relative to triangle 402 of FIG. 4A). In some embodiments, the angle that the piece bends at joint 406 of FIG. 4A is determined from the three-dimensional mesh representation (e.g., three-dimensional mesh representation 200 of FIG. 2A) and stored as part of the puzzle piece representation creation operation (e.g., the puzzle piece representation creation operation of FIG. 2A) for use in determining the appropriate length of flexible region 506. In various embodiments, puzzle piece 500 is fabricated by molding, cutting, stamping, or any other appropriate fabrication technique.

Figure 5B:
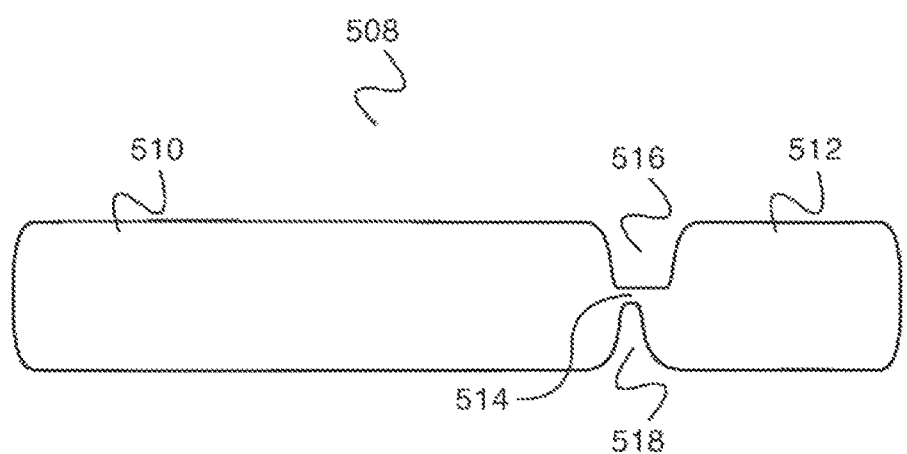
FIG. 5B is a diagram illustrating an embodiment of a puzzle piece.

FIG. 5B is a diagram illustrating an embodiment of a puzzle piece. FIG. 5B comprises a side view. In some embodiments, puzzle piece 508 comprises a side view of puzzle piece 428 of FIG. 4D. In the example shown, puzzle piece 508 comprises first structural region 510, second structural region 512, flexible region 514, gap 450, and gap 452. In some embodiments, first structural region 510 comprises triangle 430 of FIG. 4D and second structural region 512 comprises attachment point 432 of FIG. 4D. In some embodiments, the portion of flexible region 514 below gap 516 comprises first joint region 434 of FIG. 4D, and the portion of flexible region above gap 518 comprises second joint region 434 of FIG. 4D. The size of gap 516 (e.g., the shortest distance from an upper edge of first structural region 510 to an upper edge of second structural region 512) determines the maximum angle that the piece can bend (e.g., the maximum angle that attachment point 432 of FIG. 4D can bend relative to triangle 430 of FIG. 4D) in a first direction (e.g., upwards as drawn on the page in FIG. 5B). The size of gap 518 (e.g., the shortest distance from a lower edge of first structural region 510 to a lower edge of second structural region 512) determines the maximum angle that the piece can bend (e.g., the maximum angle that attachment point 432 of FIG. 4D can bend relative to triangle 430 of FIG. 4D) in a second direction (e.g., downwards as drawn on the page in FIG. 5B).

In some embodiments, the angle that the piece bends at first joint region 434 of FIG. 4D or second joint region 436 of FIG. 40 is determined from the three-dimensional mesh representation (e.g., three-dimensional mesh representation 200 of FIG. 2A) and stored as part of the puzzle piece representation creation operation (e.g., the puzzle piece representation creation operation of FIG. 2A) for use in determining the appropriate size of gap 516 or gap 518. In some embodiments, the size of gap 516 is determined from, the desired maximum angle the joint is to bend in a first direction, and the size of gap 518 is fabricated to be a minimum size, to permit a minimum amount offending in a second direction. In some embodiments, puzzle piece 508 is fabricated by molding.

Figure 6:
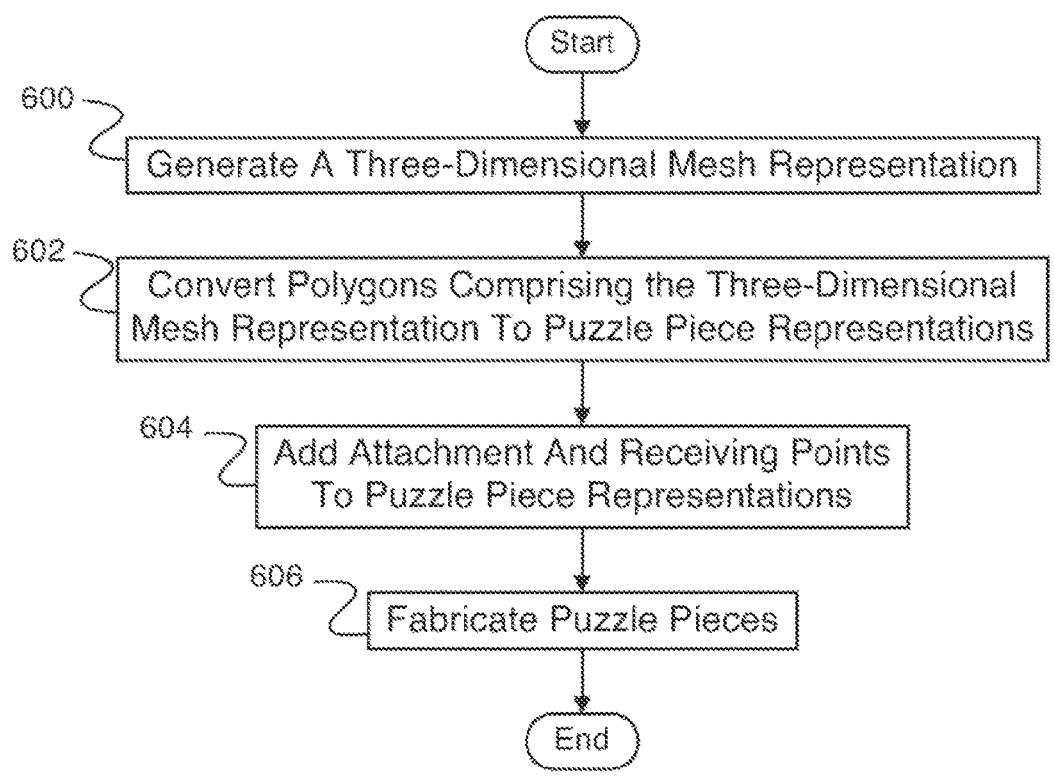
FIG. 6 is a flow diagram illustrating an embodiment of a process for creating a puzzle.

FIG. 6 is a flow diagram illustrating an embodiment of a process for creating a puzzle. In the example shown, in 600, a three-dimensional mesh representation is generated. In 602, polygons comprising the three-dimensional mesh representation are converted to puzzle piece representations. In 604, attachment and receiving points are added to the puzzle piece representations. In 606, the puzzle pieces are fabricated.

Figure 7:
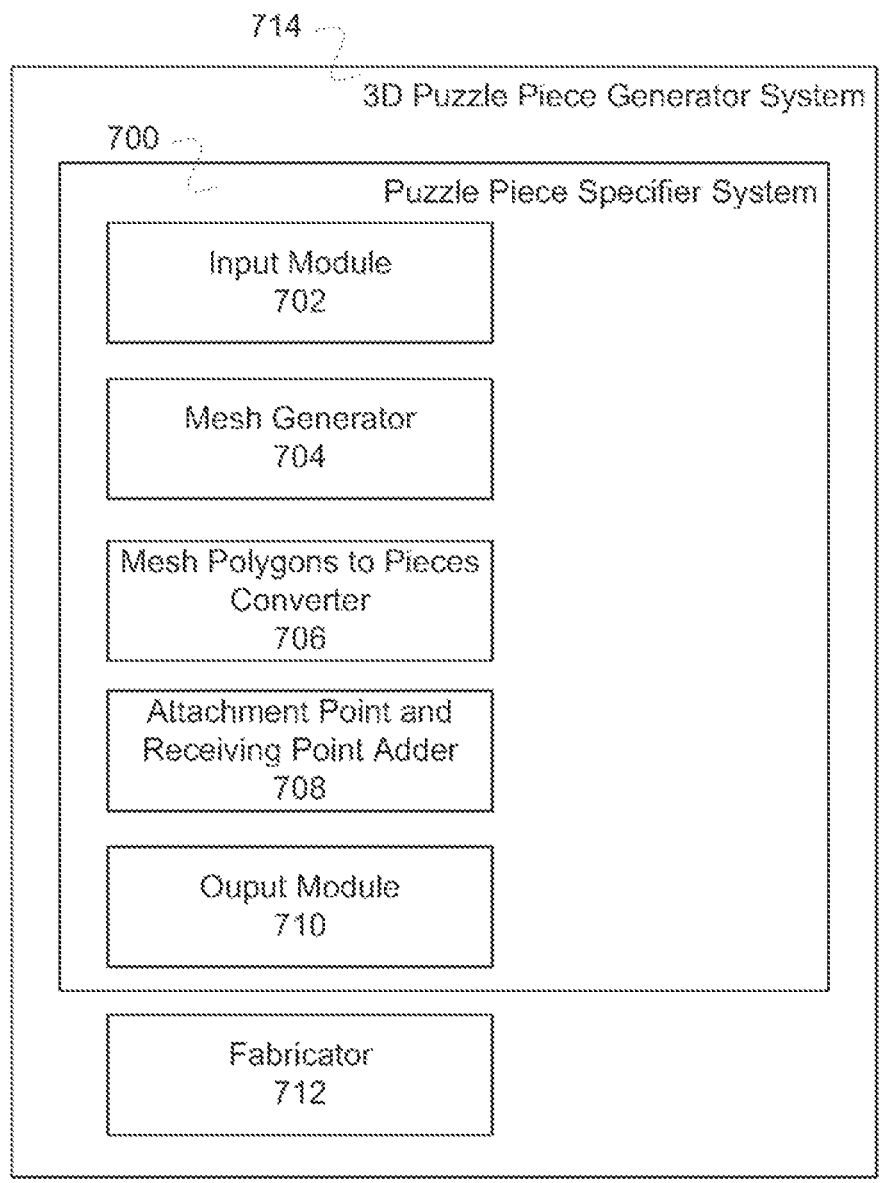
FIG. 7 is a block diagram illustrating an embodiment of a 3D puzzle piece generator system.

FIG. 7 is a block diagram illustrating an embodiment of a 3D puzzle piece generator system. In the example shown, 3D puzzle piece generator system 714 comprises puzzle piece specifier system 700 and fabricator 712. Puzzle piece specifier system 700 comprises a system to specify a puzzle piece to fabricator 712 so that fabricator 712 can fabricate the one or more puzzle pieces. Input module 702 receives a three dimensional shape. Mesh generator 704 generates a three dimensional mesh from the three dimensional shape. Mesh polygon to pieces converter 706 converts the three dimensional mesh to one or more puzzle pieces. Attachment point and receiving point adder 708 adds attachment points and receiving points to the one or more puzzle pieces so that separate puzzle pieces can be attached to construct a shape similar to the input three dimensional shape. Output module 710 outputs instructions to fabricator 712 to fabricate the one or more puzzle pieces including the attachment points and the receiving points.

In various embodiments, 3D puzzle piece generator system 714 and/or puzzle piece specifier system 700 includes one or more processors coupled to one or more memories providing instructions to the one or more processors. The one or more memories comprise one or more of the following: a semiconductor memory, a magnetic hard drive memory, or any other appropriate memory.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computing system for automatically generating a three-dimensional puzzle, comprising:
   a memory that includes a mesh generator, a polygon-to-pieces converter, and an output module; and
   a processor coupled to the memory, wherein:
   when executing the mesh generator, the processor is configured to generate a three-dimensional mesh representation from a three-dimensional surface representation, wherein the three-dimensional mesh representation comprises a plurality of polygons that includes a first polygon that is disposed adjacent to a second polygon and is further positioned at a first angle relative to the second polygon, wherein the three-dimensional mesh representation reduces average error or peak error relative to the three-dimensional surface representation;

when executing the polygon-to-pieces converter, the processor is configured to generate a plurality of puzzle piece representations from the plurality of polygons, wherein each puzzle piece representation included in the plurality of puzzle piece representations is represented in two dimensions; and when executing the output module, the processor causes a fabricator to fabricate a plurality of puzzle pieces from the plurality of puzzle piece representations, wherein the plurality of puzzle piece representations includes a first puzzle piece representation corresponding to the first polygon and a second puzzle piece representation corresponding to the second polygon, and wherein the first puzzle piece representation includes a first attachment point configured to couple the first puzzle piece representation to the second puzzle piece representation at the first angle.

2. The system of claim 1, wherein the second puzzle piece representation includes a receiving point configured to be coupled to the first attachment point.

3. The system of claim 1, wherein a puzzle piece fabricated according to the first puzzle piece representation includes a top layer, a bottom layer, and a middle layer.

4. The system of claim 3, wherein the middle layer is flexible and the top layer and the bottom layer are rigid.

5. The system of claim 1, wherein the three-dimensional mesh representation is based on a three-dimensional surface.

6. The system of claim 1, wherein the first attachment point is located on a first edge of the first puzzle piece representation, and a second attachment point is also located on the first edge.

7. The system of claim 1, wherein the first puzzle piece representation includes a first triangle, a second triangle, and a flexible joint between the first triangle and the second triangle.

8. The system of claim 1, wherein the first attachment point is associated with a flexible joint and a gap sized to form a first maximum bend angle based on the first angle.

9. The system of claim 1, wherein the three-dimensional surface representation comprises at least one of a Bezier curve and a NURBS curve.

10. The system of claim 1, wherein generating the plurality of puzzle piece representations from the plurality of polygons comprises converting two or more polygons included in the plurality of polygons into the first puzzle piece representation included in the plurality of puzzle piece representations.

11. A method for automatically generating a three-dimensional puzzle, comprising:

generating, via a processor, a three-dimensional mesh representation from a three-dimensional surface representation, wherein the three-dimensional mesh representation comprises a plurality of polygons that includes a first polygon that is disposed adjacent to a second polygon and is further positioned at a first angle relative to the second polygon, wherein the three-dimensional mesh representation reduces average error or peak error relative to the three-dimensional surface representation;

generating a plurality of puzzle piece representations from the plurality of polygons, wherein each puzzle piece representation included in the plurality of puzzle piece representations is represented in two dimensions; and causing a fabricator to fabricate a plurality of puzzle pieces from the plurality of puzzle piece representations, wherein the plurality of puzzle piece representations includes a first puzzle piece representation corresponding to the first polygon and a second puzzle piece representation corresponding to the second polygon, and wherein the first puzzle piece representation includes a first attachment point configured to couple the first puzzle piece representation to the second puzzle piece representation at the first angle.

12. The method of claim 11, wherein the second puzzle piece representation includes a receiving point configured to be coupled to the first attachment point.

13. The method of claim 11, wherein a puzzle piece fabricated according to the first puzzle piece representation includes a top layer, a bottom layer, and a middle layer.

14. The method of claim 13, wherein the middle layer is flexible and the top layer and the bottom layer are rigid.

15. The method of claim 11, further comprising generating the three-dimensional mesh representation based on a three-dimensional surface.

16. The method of claim 11, wherein the first attachment point is located on a first edge of the first puzzle piece representation, and a second attachment point is also located on the first edge.

17. The method of claim 11, wherein the first puzzle piece representation includes a first triangle, a second triangle, and a flexible joint between the first triangle and the second triangle.

18. The method of claim 11, wherein the first attachment point is associated with a flexible joint and a gap sized to form a first maximum bend angle based on the first angle.

19. A non-transitory computer-readable medium for automatically generating a three-dimensional puzzle, the non-transitory computer-readable medium storing instructions that, when executed by a processor, cause the processor to execute the steps of:

generating a three-dimensional mesh representation from a three-dimensional surface representation, wherein the three-dimensional mesh representation comprises a plurality of polygons that includes a first polygon that is disposed adjacent to a second polygon and is further positioned at a first angle relative to the second polygon, wherein the three-dimensional mesh representation reduces average error or peak error relative to the three-dimensional surface representation;

generating a plurality of puzzle piece representations from the plurality of polygons, wherein each puzzle piece representation included in the plurality of puzzle piece representations is represented in two dimensions; and causing a fabricator to fabricate a plurality of puzzle pieces from the plurality of puzzle piece representations, wherein the plurality of puzzle piece representations includes a first puzzle piece representation corresponding to the first polygon and a second puzzle piece representation corresponding to the second polygon, and wherein the first puzzle piece representation includes a first attachment point configured to couple the first puzzle piece representation to the second puzzle piece representation at the first angle.

20. The non-transitory computer-readable medium of claim 19, wherein the second puzzle piece representation includes a receiving point configured to be coupled to the first attachment point.

21. The non-transitory computer-readable medium of claim 19, wherein a puzzle piece fabricated according to the first puzzle piece representation includes a top layer, a bottom layer, and a middle layer.

22. The non-transitory computer-readable medium of claim 21, wherein the middle layer is flexible and the top layer and the bottom layer are rigid.

\* \* \* \* \*

UNITED STATES PATENT AND TRADEMARK OFFICE
CERTIFICATE OF CORRECTION

PATENT NO. : 10,195,519 B2
APPLICATION NO. : 14/154576
DATED : February 5, 2019
INVENTOR(S) : Jonathan Bachrach and Saul Griffith Page 1 of 1

It is certified that error appears in the above-identified patent and that said Letters Patent is hereby corrected as shown below:

On the Title Page

(60) Related U.S. Application Data:
Please delete "Provisional application No. 61/277,536, filed Sep. 27, 2009." and insert --Provisional application No. 61/277,536, filed Sep. 24, 2009.--.

Signed and Sealed this
Sixteenth Day of April, 2019

Andrei Iancu
*Director of the United States Patent and Trademark Office*